Patented June 24, 1941

2,246,645

UNITED STATES PATENT OFFICE 2,246,645

RECOVERY OF HALOGENS

Oliver M. Urbain and William R. Stemen, Columbus, Ohio, assignors to Charles H. Lewis, Harpster, Ohio No Drawing. Application February 23, 1939, Serial No. 258,100

8 Claims. (Cl. 23—217)

This invention relates to the recovery of halogens from solutions containing halides.

More particularly, this invention relates to the recovery of bromine and iodine from saline solutions such as sea water, deep well brines and by-product liquids from the salt industry.

Bromine and iodine occur in many liquids, but, in general, the concentration of these elements in such liquids as sea water and deep well brines is very dilute, making recovery difficult and expensive. Bromine occurs in sea water in concentrations of approximately 60.0 parts per million. Certain mineral waters and salt springs contain much higher concentrations of bromine. Deep well brines and liquids which are by-products of the salt industry often contain as much as 2500 ppm. of bromine, and variable quantities of iodine. For example, in the manufacture of potassium chloride from carnallite there is produced a mother-liquor containing 2500 ppm. of bromine as magnesium bromide. Iodine is also found in deep well brines in various quantities. For example, it is known that the waters from certain Russian naphtha wells contain from 15 to 200 ppm. of iodine.

In view of the large demand for bromine and iodine in such industries as the manufacture of dyes, ethyl gasoline, synthetic organic chemicals, pharmaceuticals, etc., it will be seen that the recovery of these halogens from solutions in which they are present, even though in low concentrations, is of extreme commercial importance.

Processes now in use for the recovery of these halogens from such solutions depend in general upon converting the bromides and iodides into elemental bromine and iodine by oxidation, either electrolytically or chemically, expelling the elemental bromine and iodine from the large quantity of water in which it is contained; adsorbing the halogens with adsorbing agents such as activated carbons or strongly alkaline solutions; and recovering the halogens from the adsorption media in various ways.

The most convenient chemical method for oxidation of bromides and iodides to bromine and iodine has been found to be the use of elemental chlorine, which is generally passed through the saline solution containing the halides to effect oxidation. To effectively and quantitatively accomplish the oxidation of the halides contained in the saline solutions, it has been found desirable to carry out the oxidation in acid solutions, preferably those solutions having a pH of from 3.0 to 6.0. The halogens released by oxidation are swept out of the liquid by a compressed air current after which this air current is passed over or through the adsorption media.

When activated carbon is employed as the adsorption medium, the halogens adsorbed thereupon may be driven out of the carbon by steam or by external heat treatment and recovered by conventional methods.

We have now discovered a process by which bromine and iodine may be released from solutions containing bromides and iodides and recovered in a manner much more economical and advantageous than by the processes of the prior art. By the process hereinafter described preliminary acidification of solutions containing halides has been made unnecessary. Additionally, the chlorine necessary for releasing bromine and iodine in saline solutions containing halides has been considerably diminished in quantity and made much more available for exchange with the desired bromine and iodine. By the processes of this invention it is necessary only to employ that quantity of chlorine necessary for effective exchange with the bromine and iodine contained in the saline solutions. There is thereby avoided use of excessive quantities of chlorine such as are often required in prior known processes to oxidize organic impurities present in halide containing saline solutions. Furthermore, this invention eliminates the need of compressed air to blow out the elemental bromine released from saline solutions. Although active carbon is employed in the processes herein described, it has been found that continual use of the specially prepared active carbon does not bring about a loss in effectiveness of the carbon as is experienced in the processes of the prior art. Other advantages of this invention will be apparent to those skilled in the art from the following description.

We have found that an active carbon which has been saturated with chlorine may be utilized to effect release of bromine and iodine from solutions containing bromides and iodides and simultaneously to effect adsorption of elemental bromine and iodine thus released in one operation. Hereinafter, the materials employed may be variously referred to as: an active carbon which has been saturated with gaseous chlorine, a chlorinated active carbon, a chlorinated carbon.

When a solution containing either bromides or iodines or both is brought into contact with an active carbon which has been saturated with gaseous chlorine, the chlorine adsorbed thereon effects release of bromine and iodine in such solutions and exchanges its position with these elements with the resultant production of an active carbon containing bromine and iodine held by adsorption. By means of preferential adsorption bromine and iodine may be recovered from solutions in which bromides and iodides are present in low concentration.

To prepare the chlorinated carbon employed in our process, gaseous chlorine is passed over and through any of the various active carbons until the latter become saturated with adsorbed chlorine.

In the preparation of the chlorinated carbon, it has been found that an active carbon will adsorb sufficient chlorine to increase its weight by about 60%. However, it has been found that only a portion of the adsorbed chlorine, in some cases as much as 60%, is available for release and exchange with bromine and iodine, the remainder remaining fixed on the carbon. Experiments have indicated that the chlorine not available for exchange resists very severe displacement treatment such for example as prolonged treatment with super-heated steam. Therefore, once the material has been prepared and utilized in the invention herein described, the regeneration of the material involves substituting only the quantity of chlorine which has been actually displaced by bromine or iodine in the process.

Through the use of chlorinated carbon which has been prepared in accordance with this invention, it has been found that in general approximately two units by weight of chlorine are required to exchange with one unit by weight of either bromine or iodine during the exchange process. The exchange reaction proceeds very rapidly until the adsorbed chlorine available for exchange has been displaced. When this occurs, no further exchange of bromine or iodine is effected although it has been found that the available chlorine is very active up until the moment when all chlorine available for exchange has been exhausted.

The rate at which the liquid containing bromides and iodides may be passed through a unit charged with chlorinated carbon has been found to be relatively immaterial. However, better efficiency is secured by passing the liquid through the chlorinated carbon at a rate rapid enough to prevent any substantial loss of the available chlorine to a liquid from which the bromine and iodine has already been replaced.

After all available chlorine in a chlorinated carbon exchange unit has been exchanged for bromine and iodine, the latter elements are recovered from the filter unit by applying heat externally to the unit or by passing super-heated steam through the unit and condensing the halogen vapors by means of an ordinary condenser. The bromine and iodine may be recovered from the condensate by any of the conventional methods now employed, such as fractional distillation and sublimation. Any of the bromine which has become converted to hydrogen bromide in the condensate may be treated to release bromine therefrom by such conventional steps as oxidation with chlorine.

Illustrative of the operation of the herein described process, and various stages thereof, are the following examples.

EXAMPLE I

A chlorinated carbon was prepared by passing gaseous chlorine through one kilogram of 60 minute 8 to 10 mesh coconut carbon, for a period of approximately two hours. During the chlorination of the carbon, its increase in weight was measured at frequent intervals and it was found that the carbon became saturated with adsorbed chlorine in approximately ninety minutes. The increase in weight is shown in Table 1.

TABLE 1

*Increase in weight of 1 kg. of coconut carbon during treatment with gaseous chlorine*

| Time, minutes | Increase in weight, grams | Percentage |
|---|---|---|
| 30 | 90 | 9 |
| 45 | 150 | 15 |
| 60 | 270 | 27 |
| 90 | 640 | 64 |
| 105 | 660 | 66 |
| 120 | 660 | 66 |

This material was allowed to stand for a period of several days to determine its stability upon exposure. It was found to lose approximately 60 grams during the first 48 hours and to lose thereafter relatively no weight. It will thus be seen that the quantity of chlorine actually adsorbed in a relatively stable form upon the active carbon approximates 60% of the weight of carbon originally employed.

EXAMPLE II

The chlorinated carbon prepared in Example I (1600 g.) was charged into a unit equipped with proper controls for passing liquids through the unit. Through this unit there was passed a liquid containing the same approximate concentration of solids as contained in sea water and to which had been added sufficient potassium bromide to bring the bromine concentration up to approximately 2500 parts per million. The artificial sea water thus prepared was passed through the unit at the rate of approximately 150 liters per hour until the unit was exhausted as indicated by the presence of bromine in the effluent from the unit. The bromine taken up by the chlorinated carbon was then expelled from the unit by passing super-heated steam through the unit until all bromine was expelled. The exhausted chlorinated carbon was then removed, thoroughly washed and dried, and weighed to determine the loss in weight in chlorine effected through exchange with the bromine released from the artificial sea water. It was found that the chlorinated carbon originally weighing 1600 grams (600 grams of which represented adsorbed chlorine) had lost approximately 140 grams in weight, thus indicating an available chlorine index of 14% for this chlorinated carbon based on weight of active carbon employed.

The following table summarizes the data employed to secure the available chlorine index for this particular chlorinated carbon, prepared from 60 minute 8 to 10 mesh coconut carbon.

TABLE 2

*Available chlorine index for chlorinated coconut carbon*

Wt. of coconut carbon_____grams__ 1000
Chlorine adsorbed in stable form___do____ 600
Chlorine exchanged for bromine____do____ 140
Percentage available chlorine___per cent__ 14
Percentage fixed chlorine_____do____ 46

EXAMPLE III

In order to determine the quantity of bromine effectively exchanged by the chlorinated coconut carbon hereinbefore described, the exhausted chlorinated carbon remaining from the determination of available chlorine index was regenerated by passing gaseous chlorine therethrough until it had become saturated and regained its weight of approximately 1600 grams. It was then returned to the exchange unit and an artificial sea water containing 1000 parts per million of bromine passed through the exchange unit at the rate of 150 liters per hour. Samples of the effluent were collected as each ten liters had passed through the unit, and these samples were analyzed for bromine content. No bromine was found in the samples of effluent collected from the unit until after 60 liters had passed therethrough. A sample of the effluent collected after seventy liters had passed through the unit showed a bromine content of 480 parts per million. After 80 liters had passed through the unit, the effluent showed a bromine content of 880 parts per million. The samples taken after 90 and 100 liters had passed through the unit showed bromine contents of 950 parts per million and 980 parts per million respectively, as compared with the original bromine content of 1000 ppm. in the solution.

These results indicate that the particular chlorinated coconut carbon employed in these experiments and containing 140 grams of chlorine available for exchange was effective in completely removing the bromine from between 70 and 80 liters of an artificial sea water containing 1000 parts per million of bromine. The actual quantity of bromine removed was thus found by computation to slightly exceed 70 grams thus indicating that approximately two units of available chlorine had been exchanged for one unit of bromine.

The results of this experiment are tabulated in Table 3 below, which additionally shows that when a chlorinated carbon unit reaches its capacity it becomes exhausted very suddenly.

TABLE 3

*Bromine remaining in effluent from treatment of liquid containing 1000 ppm. bromine with 1600 g. chlorinated carbon filter containing 140 grams available chlorine*

| Liquid thru unit, liters | Bromine content, ppm. |
|---|---|
| 10 | None |
| 20 | None |
| 30 | None |
| 40 | None |
| 50 | None |
| 60 | None |
| 70 | 480 |
| 80 | 880 |
| 90 | 950 |
| 100 | 980 |

EXAMPLE IV

To determine the quantity of bromine which could be recovered from the chlorinated carbon which had been used in Example III, superheated steam was passed through the unit and the vapors thereafter condensed. The condensate was found to contain 70.8 grams of bromine. It will thus be seen that approximately 100% of bromine extracted from sea water through the use of a chlorinated carbon filter may be recovered by the processes herein described.

The above experiments were repeated using solutions containing iodides instead of bromides and also using solutions containing both iodides and bromides. It was found that chlorinated carbon prepared in accordance with the teachings of this invention was effective to remove iodine from such solutions with the same efficiency as indicated by the above examples relative to the removal of bromine. Approximately two parts of chlorine are required to remove one part by weight of iodine, similar to the quantity required for bromine exchange.

Although the above examples indicate the results obtainable through the utilization of a 60 minute coconut carbon, it is to be particularly understood that various active carbons may be employed in the processes of this invention. It has been found that the available chlorine index of the various active carbons which have been chlorinated by passing gaseous chlorine therethrough will vary between 5 and 36% depending upon the nature of the active carbon employed.

The advantages of a process in which bromine or iodine may be exchanged with chlorine adsorbed on an active carbon will be apparent to those skilled in the art. As has been pointed out, through the use of a chlorinated carbon, it becomes unnecessary to closely control the acidity of saline solutions from which it is desired to recover the bromine and iodine. This is particularly advantageous in connection with the recovery of these halogens from sea water and saline solutions obtained as by-products from the salt industry, since these solutions are, in general, alkaline and under the prior known processes, require neutralization and acidification prior to removal of the halogens therefrom.

Additionally, through the employment of the processes herein described, it becomes unnecessary to employ excessive quantities of chlorine to oxidize the bromine and such organic matter as is commonly contained in such saline solutions as sea water. Saline solutions containing large quantities of organic matter have been effectively treated to remove bromine and iodine therefrom with chlorinated carbon by the process herein described, and it has been found that the presence of organic matter does not affect the efficiency of the process in any manner.

In view of the fact that when chlorinated carbon is employed to recover bromine and iodine from saline solutions no compressed air is necessary to blow out the liberated halogens, a considerable saving is obtained over the processes of the prior art. Further additional economies are experienced due to the fact that it has been necessary under the prior known processes to completely discharge the carbon unit containing adsorbed halogens with a resulting mechanical loss in carbon of approximately 5%. By the methods herein described no mechanical loss in carbon is experienced.

It is to be expressly understood that the foregoing description is exemplary only and that the scope of this invention is not to be limited thereby beyond the scope of the subjoined claims.

Having thus described our invention, what we claim is:

1. The process of extracting bromine and iodine from liquids containing said halogens which comprises contacting said liquids with an active carbon saturated with adsorbed chlorine.

2. The process of recovering bromine and iodine from solutions containing said halogens which comprises contacting said solutions with an active carbon saturated with adsorbed chlorine.

3. The process of recovering bromine and iodine from solutions containing said halogens which comprises effecting exchange between said halogens and chlorine adsorbed on an active carbon.

4. The process of recovering bromine and iodine from solutions containing said halogens which comprises effecting preferential adsorption of said halogens by means of an active carbon saturated with adsorbed chlorine.

5. The process of recovering bromine and iodine from solutions containing said halogens which comprises simultaneously effecting release and adsorption of said halogens by means of an active carbon saturated with adsorbed chlorine.

6. The process of recovering bromine and iodine from solutions containing said halogens which comprises contacting said solutions with an active carbon containing adsorbed chlorine available for release of and exchange with said bromine and iodine of said solutions.

7. The process of recovering bromine and iodine from solutions containing said halogens which comprises simultaneously effecting conversion of said halides to elemental halogens and adsorbing said halogens by means of an active carbon saturated with adsorbed chlorine.

8. The process of recovering bromine and iodine from solutions containing said halogens which comprises effecting exchange between said halogens and chlorine adsorbed on an active carbon, obtaining said bromine and iodine by expelling the same from said active carbon, and regenerating said active carbon by saturating the same with gaseous chlorine.

OLIVER M. URBAIN.
WILLIAM R. STEMEN.